US007818075B2

(12) United States Patent
Johnson et al.

(10) Patent No.: US 7,818,075 B2
(45) Date of Patent: Oct. 19, 2010

(54) AUTOMATED PROGRAMMING SYSTEM EMPLOYING NON-TEXT USER INTERFACE

(75) Inventors: Simon B. Johnson, Bonney Lake, WA (US); Lev M. Bolotin, Kirkland, WA (US); Roger Sharp, Lake Forest Park, WA (US)

(73) Assignee: Data I/O Corporation, Redmond, WA (US)

( * ) Notice: Subject to any disclaimer, the term of this patent is extended or adjusted under 35 U.S.C. 154(b) by 450 days.

(21) Appl. No.: 11/467,087

(22) Filed: Aug. 24, 2006

(65) Prior Publication Data

US 2007/0260339 A1 Nov. 8, 2007

Related U.S. Application Data

(60) Provisional application No. 60/797,462, filed on May 3, 2006.

(51) Int. Cl.
*G05B 15/00* (2006.01)
(52) U.S. Cl. .......................... 700/83; 700/121; 715/977
(58) Field of Classification Search .................. 700/83, 700/95, 121, 86; 715/967, 977
See application file for complete search history.

(56) References Cited

U.S. PATENT DOCUMENTS

| 4,413,277 | A | * | 11/1983 | Murray | 348/86 |
| 5,592,373 | A | | 1/1997 | Barthel et al. | |
| 6,140,926 | A | * | 10/2000 | Hayden et al. | 340/635 |
| 6,195,165 | B1 | | 2/2001 | Sayegh | |
| 6,449,523 | B1 | * | 9/2002 | Johnson et al. | 700/121 |
| 6,487,623 | B1 | | 11/2002 | Emerson et al. | |
| 6,538,244 | B1 | | 3/2003 | Skunes | |
| 6,587,743 | B1 | * | 7/2003 | White et al. | 700/121 |
| 6,647,303 | B1 | * | 11/2003 | Johnson et al. | 700/95 |
| 6,671,564 | B1 | * | 12/2003 | Johnson et al. | 700/121 |
| 6,695,205 | B1 | * | 2/2004 | Lundstrom et al. | 235/380 |
| 6,895,661 | B1 | | 5/2005 | Gamel et al. | |
| 2004/0059440 | A1 | * | 3/2004 | Renner | 700/19 |
| 2005/0047645 | A1 | * | 3/2005 | Funk et al. | 382/145 |
| 2005/0235259 | A1 | | 10/2005 | Lueckhoff | |

FOREIGN PATENT DOCUMENTS

JP 2003022139 1/2003

* cited by examiner

*Primary Examiner*—Albert DeCady
*Assistant Examiner*—Steven R Garland
(74) *Attorney, Agent, or Firm*—Mikio Ishimaru

(57) ABSTRACT

An automated programming system that includes configuring the automated programming system to include an input module, a programming module, and an output module. Employing a non-text user interface system for real-time representation of the input module, the programming module and the output module.

13 Claims, 3 Drawing Sheets

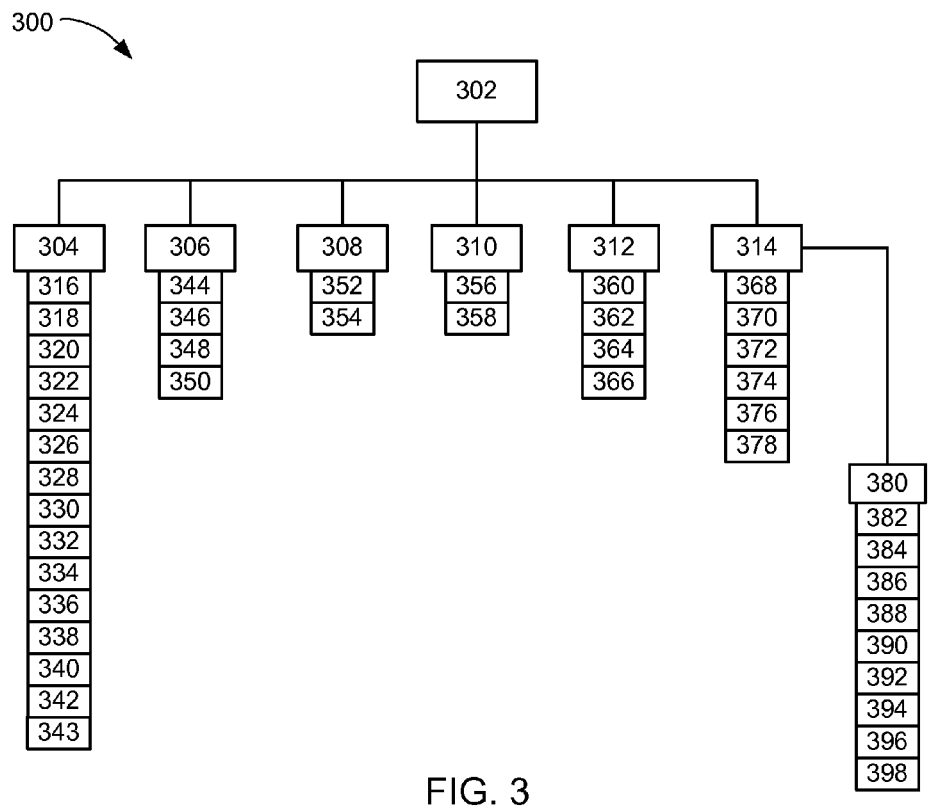
FIG. 3
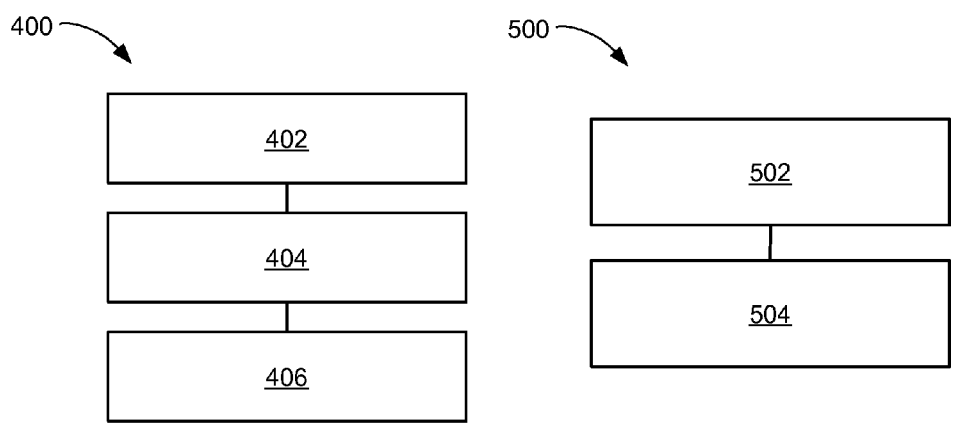
FIG. 4
FIG. 5

AUTOMATED PROGRAMMING SYSTEM EMPLOYING NON-TEXT USER INTERFACE

CROSS-REFERENCE TO RELATED APPLICATION(S)

This application claims the benefit of U.S. Provisional patent application Ser. No. 60/797,462 filed May 3, 2006.

The present application contains subject matter related to a U.S. patent application Ser. No. 11/676,733. The related application is assigned to Data I/O Corporation.

The present application also contains subject matter related to a U.S. patent application Ser. No. 11/381,696. The related application is assigned to Data I/O Corporation.

The present application further contains subject matter related to a U.S. patent application Ser. No. 11/381,532. The related application is assigned to Data I/O Corporation.

TECHNICAL FIELD

The present invention relates generally to automated systems, and more particularly to automated programming systems.

BACKGROUND ART

Currently existing user interface programming systems do not allow for very good integration with automated programming systems. Existing user interface programming systems are built upon industry standards designed for either manual programming systems or automatic handlers, which have not been designed to handle and integrate programming tasks. Consequently, existing user interface programming systems lack the ability to efficiently control programming operations, comprehensively job manage, and provide seamless communication integration between the programming equipment and the user input interface.

Additional problems associated with existing user interface programming systems include the inability to allow operation of programming systems without textual language, the inability to display a real time representation of the programming system to reflect the realities of the workspace and the failure to display a graphical error message. For example, a user interface programming system based on text language (e.g.—English) could not be effectively operated globally without translation. Additionally, the inability of the programming system to display a real time representation of the workspace renders the user interface obsolete because it could display inaccurate information.

Ideally, the user interface of a programming system should efficiently manage and control the device handling and programming operations of an automated programming system by maintaining and communicating essential operation information through a non-textual user interface supported by a real-time representation of the programming workspace.

Thus, a need still remains for a non-textual user interface supported by a real-time representation of the programming workspace. In view of the ever-increasing need to save costs and improve efficiencies, it is critical that answers be found to these needs.

Solutions to these needs have been long sought but prior developments have not taught or suggested any solutions and, thus, solutions to these problems have long eluded those skilled in the art.

DISCLOSURE OF THE INVENTION

The present invention provides an automated programming system, which includes configuring the automated programming system to include an input module, a programming module, and an output module, and employing a non-text user interface system for real-time representation of the input module, the programming module and the output module.

Certain embodiments of the invention have other aspects in addition to or in place of those mentioned above. The aspects will become apparent to those skilled in the art from a reading of the following detailed description when taken with reference to the accompanying drawings.

BRIEF DESCRIPTION OF THE DRAWINGS

FIG. 3 is a user interface high-level architecture in accordance with an embodiment of the present invention;

FIG. 4 is a workflow diagram for an automated programming system in accordance with an embodiment of the present invention; and FIG. 5 is a flow chart for an automated programming system for utilizing the automated programming system in accordance with an embodiment of the present invention.

BEST MODE FOR CARRYING OUT THE INVENTION

Figure 1:
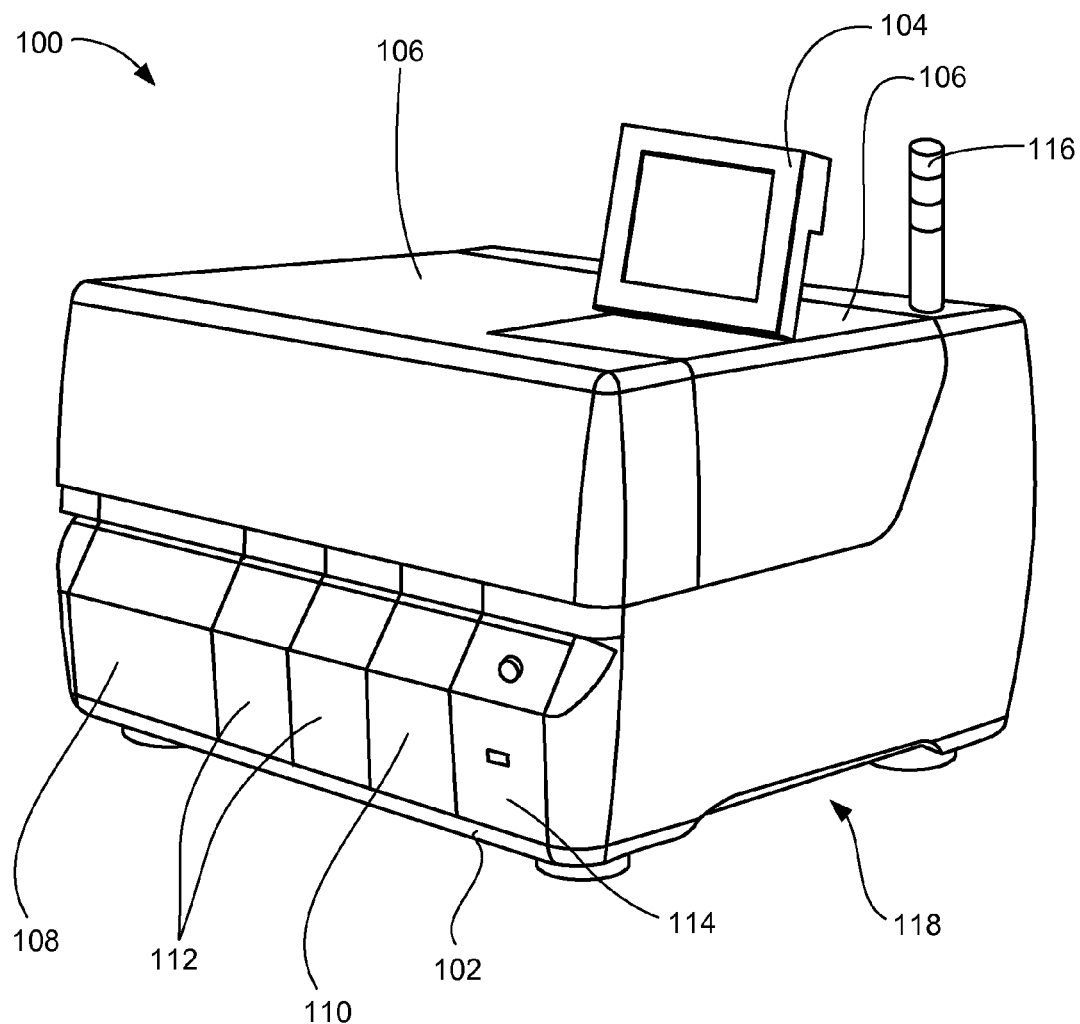
FIG. 1 is an isometric view of an automated programming system in accordance with an embodiment of the present invention.

The following embodiments are described in sufficient detail to enable those skilled in the art to make and use the invention, and it is to be understood that other embodiments would be evident based on the present disclosure and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known system representations, and process steps are not disclosed in detail. Likewise, the drawings showing embodiments of the invention are semi-diagrammatic and not to scale and, particularly, some of the dimensions are for the clarity of presentation and are shown exaggerated in the drawing FIGs. In addition, where multiple embodiments are disclosed and described having some features in common, for clarity and ease of illustration, description, and comprehension thereof, similar and like features one to another will ordinarily be described with like reference numerals.

The term "horizontal" as used herein is defined as a plane parallel to the plane or surface of the top of an automated programming system, regardless of its orientation. The term "vertical" refers to a direction perpendicular to the horizontal as just defined. Terms, such as "on", "above", "below", "bottom", "top", "side" (as in "sidewall"), "higher", "lower", "upper", "over", and "under", are defined with respect to the horizontal plane.

Referring now to FIG. 1, therein is shown an isometric view of an automated programming system 100 in accordance with an embodiment of the present invention. The automated programming system 100 includes a frame 102, a monitor 104, a cover 106, an input module 108, an output module 110, programming module(s) 112, control electronics 114, and a status indicator 116. As an exemplary illustration, the automated programming system 100 may include a desktop handler system, which is a portable programming system. To enhance portability of the desktop handler system, handles 118 may be built-in.

The frame 102 is the main housing that holds all the elements together and provides structural support. The monitor 104 can be mounted to a fixed portion of the cover 106. By way of example and not by way of limitation, the monitor 104 may include a touch screen user interface system that provides visual feedback to the operator.

The cover 106 is mounted to the frame 102 and covers the workspace of the machine. The cover 106 offers protection to the input module 108, the output module 110, and the programming modules 112 from dust and debris within the working environment. Additionally, the cover 106 protects an operator from unintended operational hazards.

Devices and/or media enter and exit the automated programming system 100 via removable modules, such as the input module 108 or the output module 110. Alternatively, the devices and/or media can be placed within or removed from the automated programming system 100 without removing the input module 108 and the output module 110 from the automated programming system 100, by employing trays or other receptacles, which conform to Joint Electron Device Engineering Council (JEDEC) standards, for example. However, it is to be understood that the present invention is not to be limited to such representations. In accordance with the present invention the input module 108 and the output module 110 may accommodate any device receptacle.

The programming modules 112 provide the core-processing interface for the automated programming system 100. The programming modules 112 include one or more removable modules that interface with the automated programming system 100. Each of the programming modules 112 may contain socket adapters (described in greater detail in FIG. 2), an actuator(s) (described in greater detail in FIG. 2) and a reject bin (described in greater detail in FIG. 2), for receiving devices. After the devices, such as unprogrammed programmable media, are placed within the socket adapters, the actuators close the sockets so that the devices are appropriately connected to the programming modules 112 of the automated programming system 100. Additionally, the programming modules 112 can be controlled by the automated programming system 100 for facilitating configuration setup and manual operations, such as placing and removing programmable media.

Furthermore, although not shown, the automated programming system 100 may include additional modules, such as a marking module, a tape in module and/or a tape out module.

Additionally, by way of example, each of the modules within the automated programming system 100 may include a module control, which allows each module to be set-up for purposes of programming, configuration, and identification. The module control system and its function can be integrated as part of the touch screen user interface system displayed by the monitor 104.

The control electronics 114 are also mounted on the frame 102. The control electronics 114 provide an electrical interface for the automated programming system 100. For example, the control electronics 114 may possess a power ON/OFF switch and/or digital input/output boards. The digital input/output boards may provide an interface for the activation of indicators, pumps, lights, etc., within the automated programming system 100. The digital input/output boards may also provide an interface for sensing the state of various sensors. Additionally, the control electronics 114 provides an interface for peripheral devices, such as a USB device, a keyboard, a mouse, etc.

Notably, the automated programming system 100 does not rely on external air, pneumatic or vacuum systems, which greatly enhances the portability of the machine and ease of installation. The automated programming system 100 possesses an on-board vacuum/air system that is powered by electrical current, therefore, the automated programming system 100 is a self-sufficient system that only requires electrical power for operation. Additionally, the back of the automated programming system 100 may possess additional power modules.

The status indicator 116 is also mounted on the frame 102. The status indicator 116 provides visual feedback, via a non-text error signal, to the user about machine status. As an exemplary illustration, the status indicator 116 may use a multi-color scheme employing more than one light combination. The particular combination can be done in such a way that a green light indicates the machine is in operation, a yellow light indicates that attention may be needed soon and a red light indicates there may be a problem, and the machine is stopped, or that the job has terminated normally. However, it is to be understood that any color scheme may be used to convey the notions of operation-ready, attention may be needed soon, and operation-termination.

Figure 2:
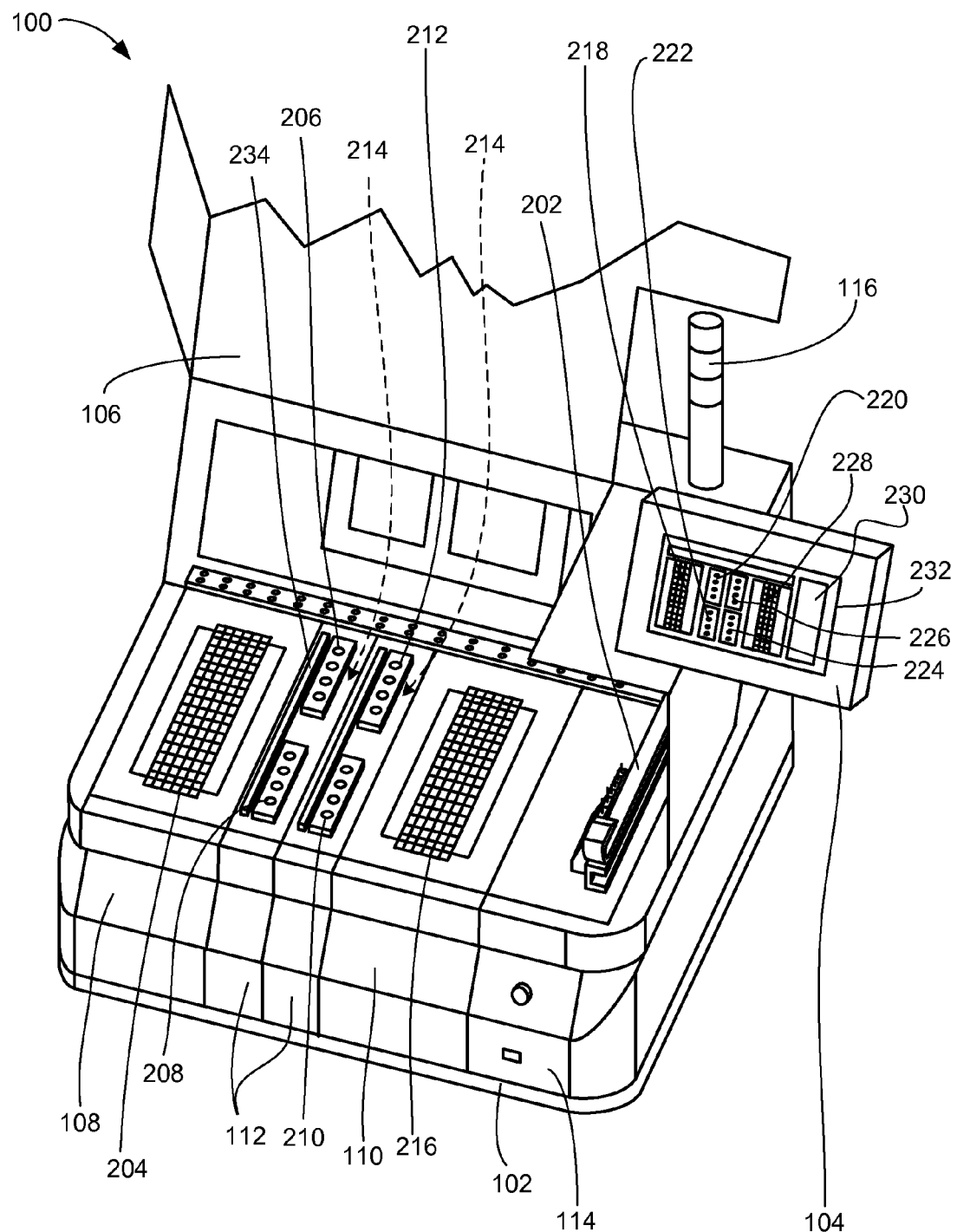
FIG. 2 is an isometric top view of an automated programming system with a representation of a working envelope on the monitor in accordance with an embodiment of the present invention.

Referring now to FIG. 2, therein is shown an isometric top view of the automated programming system 100 with a representation of a working envelope on the monitor 104 in accordance with an embodiment of the present invention. The automated programming system 100 includes the frame 102, the monitor 104, the cover 106, the input module 108, the output module 110, the programming modules 112, the control electronics 114, the status indicator 116, a robotics arm 202, an input device receptacle 204, socket adapters 206, 208, 210, 212, actuators 214, an output device receptacle 216, an input device receptacle image 218, socket adapter images 220, 222, 224, 226, an output device receptacle image 228, a job information area 230, a non-text user interface system 232, and reject bins 234. Although, not depicted, the actuators 214 are located adjacent the socket adapters 206, 208, 210, 212.

During operation the robotics arm 202 retrieves one or more devices from the input device receptacle 204 located over the input module 108. The robotics arm 202 then transports the device(s) to the programming modules 112 which possess the socket adapters 206, 208, 210, 212 and the actuators 214. Once the devices are engaged by the socket adapters 206, 208, 210, 212, programming may commence. Once programming is complete, the robotics arm 202 then transports the good devices to the output device receptacle 216, located over the output module 110, and transports the bad devices to the reject bins 234.

Also, during operation of the automated programming system 100, the monitor 104 provides a real time image of the working envelope via the non-text user interface system 232. The working envelope includes the input module 108, the output module 110, the programming modules 112, the input device receptacle 204, the socket adapters 206, 208, 210, 212, and the output device receptacle 216. The non-text user interface system 232 models the real time representation of the working envelope in such a way that the input device receptacle image 218 reflects the real time representation of the input device receptacle 204, the socket adapter images 220, 222, 224 and 226 reflect the real time representation of the socket adapters 206, 208, 210, and 212, respectively, and the output device receptacle image 228 reflects the real time representation of the output device receptacle 216.

By modeling the real time representation of the working envelope, the non-text user interface system 232 helps to eliminate operator mistakes during set up of the automated programming system 100. Additionally, the real time image presented by the non-text user interface system 232 can increase operator productivity due to its accurate representation of the working envelope.

Not only does the non-text user interface system 232 display a real time image of the working envelope, but it may also provide the job information area 230 with a plethora of functions, such as job status inquires, job control, job tools, socket use, job selection, receptacle map, and measure receptacle. These functions, which are a part of the user interface for the automated programming system 100, do not require textual representation, and therefore allow global application of the user interface.

Referring now to FIG. 3, therein is shown a user interface high-level architecture 300 in accordance with an embodiment of the present invention. The user interface high-level architecture 300 includes multiple functions and/or inputs available to an operator in a user interface system, such as the non-text user interface system 232, of FIG. 2, which allows the operator to communicate instructions and control a processing system from set-up to programming. Each of the functions and/or inputs are associated with stored information that the automated programming system 100, of FIGS. 1 and 2, has been previously programmed to retrieve. The stored information may be generated by the processing system of the automated programming system 100.

Uniquely, the user interface high-level architecture 300 communicates and interacts with the operator through a non-text interface (e.g.—without written words). These non-text communicative expressions relay information to any user of any language, accordingly enabling worldwide applicability of the present invention. In accordance with the scope of the present invention, the non-text user interface system 232 uses only numbers, characters, pictorial representations and international symbols to communicate information to an operator and not written words. Furthermore, this language independent user interface system can provide feedback to an operator via visual or auditory stimulus. Consequently, this language independent intuitive user interface virtually eliminates operator training.

For example, the user interface high-level architecture 300 can be displayed to the operator via a user interface system on the monitor 104, of FIG. 2, which controls the automated programming system 100. The user interface system may display all of the available functions and inputs on one screen. Alternatively, the user interface system may display only the functions, and when a function is selected, a list of inputs becomes available.

In general, the user interface system of the present invention includes the following functions and/or inputs to control a programming system: job selection, programming, device and hardware detection, statistical job feedback, and help.

For example, job selection allows an operator to access a hard drive and partition the files that have a programming job, displays the programming process for a selected job, displays programming hardware required for a selected job, displays job name, displays job checksum, and displays job download progress. By way of example, the job download pictorial representation can indicate the progress of job data being transmitted to installed programmers and a pictorial progress bar can be used to indicate relative job setup time remaining.

For example, programming, controls start, stop, pause and restart of the programming system, displays progress while programming transpires, displays job count to be programmed, displays a counter reset button after the job has ended, and displays the real time representation and state of all devices within the working envelope.

For example, device and hardware detection detects the modules installed in the system and displays the results, detects device receptacles installed and displays the results, detects missing modules and displays the results, detects missing device receptacles and displays the results, displays a progress bar or a scanned real time image while measuring modules and device receptacles, and displays pocket counts on the device receptacles.

For example, statistical job feedback provides information about estimated time remaining until job is completed, displays a real-time job progress bar, displays real-time job yield, displays real-time job parts per hour and displays the socket settings.

For example, help provides an operator with support, such as why a particular error is occurring and what steps need to be taken to resolve the error, via a language independent user interface system.

It is to be understood that FIG. 3 depicts by way of example and not by way of limitation, an exemplary user interface architecture for the automated programming system 100, and it is not to be construed as limiting.

In accordance with an embodiment of the present invention the user interface high-level architecture 300 may include a main screen 302 with the following functions: a job status and information function 304, a job control function 306, a job tools function 308, a socket use function 310, a job selection function 312, a receptacle map function 314, and a measure receptacle function 380. Under each function there are many useful inputs that allow an operator to visualize the programming process one step at a time, which helps in learning the automated programming system 100 quickly. Additionally, the user interface high-level architecture 300 forces an operator to choose the right sequence of steps for setting up a job, which enables a job program to be run without mistakes.

Under the job status and information function 304, inputs include: input-receptacle input 316, output-receptacle input 318, programming-modules input 320, job-progress input 322, time-remaining input 324, percent-pass input 326, devices-per-hour input 328, number-of-failures input 330, job-name input 332, job-checksum input 334, modules-present/missing input 336, socket-adapters-present/missing input 338, cover-status input 340, a reject-bin input 342, and a pictorial status input 343. Upon selection of an input by an operator, information becomes available.

For example, the input-receptacle input 316 may diagrammatically display how many rows and columns the input device receptacle 204, of FIG. 2, contains and/or display the location of the input device receptacle 204. The output-receptacle input 318 may also diagrammatically display how many rows and columns the output device receptacle 216, of FIG. 2, contains and/or display the location of the output device receptacle 216. Additionally, the input-receptacle input 316 can indicate the number of empty and occupied pockets of the input device receptacle 204, and the output-receptacle input 318 can indicate the number of empty and occupied pockets of the output device receptacle 216. This feedback can provide information regarding the upcoming need to perform a manual tray exchange.

The programming-modules input 320 diagrammatically displays how many of the programming modules 112 have been installed in the automated programming system 100 and where they are located. The automated programming system 100 may accommodate between one and three of the programming modules 112, depending on the job requirements. However, it is to be understood that the automated programming system 100 may accommodate more than three of the programming modules 112. In accordance with the invention the number of the programming modules 112 is only dependent upon the design specifications of the automated programming system 100.

The job-progress input 322 is a visual representation, such as a bar graph, that details job progression. The job-progress input 322 greatly facilitates the ease with which an operator can determine what portion of the job has been completed. The job-progress input 322 provides a dynamic real time representation of the working envelope, therefore, at any given moment this input can display the number of devices already programmed.

The time-remaining input 324 displays an estimated time remaining until job completion. The percent-pass input 326 displays the percentage yield of the devices that passed the programming job (e.g.—were successfully programmed). The devices-per-hour input 328 displays the throughput of the system via an estimated number of devices, such as programmable media, programmed in one hour. The number-of-failures input 330 displays the number of rejected devices (e.g.— programmable media) by the automated programming system 100 for various reasons, such as the inability to program.

The job-name input 332 displays the initial programming job and the job-checksum input 334 verifies a job setup value. For instance, the job-checksum input 334 evaluates an operator input value given during setup and compares it to a value determined by the automated programming system 100 after setup is complete. If the values match, then setup was correct.

The modules-present/missing input 336 displays to the operator what modules are installed in the automated programming system 100 and what modules are not installed. The socket-adapters-present/missing input 338 displays, which of the socket adapters 206, 208, 210, 212, of FIG. 2, are present and, which are missing. The cover-status input 340 displays whether the cover 106, of FIGS. 1 and 2, is open or closed and the reject-bin input 342 displays to the operator whether the reject bins 234, of FIG. 2, have been installed or not installed.

Additionally, the pictorial status input 343 can provide information about blank, processed, and rejected devices through a pictorial representation. For example, the blank devices may appear as part of the input device receptacle image 218, of FIG. 2, and can be gray in color; the processed devices may appear as part of the output device receptacle image 228, of FIG. 2, and upon successful programming can be green in color; and the rejected devices may appear as part of the reject bins 234 and can be red in color.

Under the job-control function 306, inputs include: a start input 344, a stop input 346, a pause input 348 and a reset input 350. The start input 344 begins a job and the stop input 346 ends the job completely. The pause input 348 allows an operator to pause a job and then resume at a later time. The reset input 350 allows an operator to cancel a previous job and run another job or run the same job again.

Under the job tools function 308, inputs include: a device-part-number input 352, a socket-adapter-number input 354 and a receptacle-map file input 355. The device-part-number input 352 and the socket-adapter-number input 354 are unique identification numbers that the automated programming system 100 can identify or they can be values manually input by an operator. When the programming job is setup, the program job information must match the device part number and the socket adapter number to run the job. The device-part-number input 352 identifies the type of media or device installed in the automated programming system 100 and the socket-adapter-number input 354 informs the automated programming system 100 of the correct socket adapter settings.

The receptacle-map file input 355 indicates whether the currently selected job has a receptacle-map file saved with this job. The previously saved receptacle-map file can be used for the current job and, thereby facilitate set-up of the system.

Under the socket use function 310, inputs include: number-of-insertions input 356 and expected-life input 358. The number-of-insertions input 356 displays how many insertions have been done to the socket adapters 204, of FIG. 2, and the expected-life input 358 displays an estimated number of insertions that the socket adapters 204 can cycle through before a decrease in productivity yield is expected.

Under the job selection function 312, inputs include: a drive input 360, a job-list input 362, a job-quantity input 364, and a job-functions input 366. The drive input 360 displays the available drive options for reading and writing the job. For example, the operator can read and write the job to the processing system of the automated programming system 100, to removable media, such as a USB Flash drive, or it can read and write the job to and from a remote location via an Ethernet/Internet connection. The job-list input 362 displays a potential list of different jobs to choose from.

The job quantity-input 364 displays information, such as how many media or devices need to be programmed. The job-functions input 366 displays various programming functions. For example, the job-functions input 366 can display the status of pre-selected programming functions.

Under the receptacle-map function 314, inputs include: rows input 368, columns input 370, a row-offset input 372, a row-pitch input 374, a column-offset input 376 and a column-pitch input 378. The receptacle-map function 314 allows an operator to manually enter the physical characteristics and geometry of the receptacle. For example, the number of rows and columns of the receptacle can be entered into the rows input 368 and the columns input 370, respectively. For ease of discussion, each receptacle can be plotted as a two-dimensional diagram, where the distance between rows is a vertical distance and the distance between columns is a horizontal distance. The row-offset input 372 allows an operator to enter the vertical distance between the top-left corner of a device receptacle and the first pocket, and the row pitch input 374 allows an operator to enter the vertical distance between adjacent row pocket centers. Similarly, the column-offset input 376 allows an operator to enter the horizontal distance between the top-left corner of a device receptacle and the first pocket, and the column pitch input 378 allows an operator to enter the horizontal distance between adjacent column pocket centers. Notably, the receptacle-map function 314 can create a receptacle-map file that is saved with a current job after an operator manually enters the physical characteristics of a receptacle.

Under the measure receptacle function 380, inputs include: an auto-measure rows input 382, an auto-measure-columns input 384, an auto-measure-row-offset input 386, an auto-measure-row-pitch input 388, an auto-measure-column-offset input 390, an auto-measure-column-pitch input 392, an auto-measure-column-scan input 394, an auto-measure-row-scan input 396, and an auto-measure input 398. The measure receptacle function 380 allows the operator to choose the auto-measure input 398, which will automatically measure the physical characteristics and geometry of the device receptacle. The auto-measure input 398 enables an automatic measuring system, which employs optical methods based upon changes of state, and specifically designed algorithms to calculate receptacle location, geometry and physical characteristics.

For example, the measure receptacle function 380 will automatically measure the rows and columns, the row offset and pitch and the column offset and pitch, after the number of rows and columns have been manually entered. This can be achieved by selecting the auto-measure column scan input 394 and the auto-measure row scan input 396. The auto-measure feature can employ reflective and non-reflective surfaces to determine a relative coordinate system, wherein pockets of a device receptacle are located within the relative coordinate system.

The auto-measure feature has 3 primary functions: locate a pocket center; determine the locations of pockets along a row; and determine the locations of pockets along a column. The auto-measure feature stores the pocket locations as a series of X and Y coordinates, where the location of pocket "n" is determined by XnYn. Once all the pocket locations are mapped out in an X and Y table, the row and column offsets are calculated as averages from this X and Y table.

The auto-measure feature is designed to save the operator time and prevent error because attempts at manual measurement result in bad pick and place operations. A tiny rounding error incurred during manual measurement can get quite large as the pick-and-place head is displaced from this point. The results of the auto-measure feature can be stored in a receptacle-map file that is saved with the current job.

Referring now to FIG. 4, therein is shown a workflow diagram 400 for the automated programming system 100, of FIG. 1, in accordance with an embodiment of the present invention. The workflow diagram 400 includes a system-setup block 402, a programming-job-setup block 404 and a run-job block 406. The system-setup block 402 is generally defined as the physical setup or representation of the automated programming system 100. For example, the operator might install components, such as the input module 108, of FIG. 2, the output module 110, of FIG. 2, the programming modules 112, of FIG. 2, the input device receptacle 204, of FIG. 2, the socket adapters 206, 208, 210, 212, of FIG. 2, the actuators 214, of FIG. 2, and the output device receptacle 216, of FIG. 2.

Once the physical setup is complete, the operator may commence programming via the programming-job-setup block 404. The operator may program the job setup by employing the user interface high-level architecture 300, of FIG. 3, or an equivalent user interface architecture. After the program job setup is complete, the operator may commence programming via the run-job-block 406.

Referring now to FIG. 5, therein is shown a flow chart for an automated programming system 500 for utilizing the automated programming system 100 in accordance with an embodiment of the present invention. The automated programming system 500 includes configuring the automated programming system to include an input module, a programming module, and an output module in a block 502; and employing the non-text user interface system for real-time representation of the input module, the programming module and the output module in a block 504.

From the above it will be understood that the present invention is applicable to what can be named "devices" or "media". Devices and/or media include a broad range of electronic and mechanical devices. The best mode describes programming of devices and/or media, which include, but are not limited to, Flash memories (Flash), electrically erasable programmable read only memories (EEPROM), programmable logic devices (PLDs), field programmable gate arrays (FPGAs), and microcontrollers. However, the present invention encompasses programming for all electronic, mechanical, hybrid, and other devices or media, which require testing, measurement of device characteristics, calibration, and other programming operations. For example, these types of devices and/or media would include, but not be limited to, microprocessors, integrated circuits (ICs), application specific integrated circuits (ASICs), micro mechanical machines, micro-electro-mechanical (MEMs) devices, micro modules, and fluidic systems.

It has been discovered that the present invention thus has numerous aspects. A principle aspect is the advent of the non-text user interface system employed with an automated programming system. By way of example, the non-text user interface system can handle module recognition, job selection, job setup, robot control, job status, job control, and job statistics for the automated programming system.

Another aspect of the present invention is the real time representation of the working envelope by the user interface system. By mimicking the real time representation of the working envelope, the occurrence of operator error is reduced.

Yet still, another aspect of the present invention is that the user interface system can send non-text error messages to an operator. The use of non-text error messages enhances the ease of operation of the automated programming system by employing popup dialogs, which convey information in a pictorial format within the non-text user interface system. For example, when the input device receptacle runs empty and the status indicator illuminates red, a popup dialog may show the manual removal and replacement of the input device receptacle.

These and other valuable aspects of the present invention further the state of the technology to at least the next level.

Thus, it has been discovered that the automated programming system of the present invention furnishes important and heretofore unknown and unavailable solutions, capabilities, and functional aspects. For instance, the automated programming system of the present invention employs a non-text user interface system, non-text error messages, and real time representation of the working envelope to facilitate user operation of an automated programming system. The resulting processes and representations are straightforward, cost-effective, uncomplicated, highly versatile and effective, can be implemented by adapting known technologies, and are thus readily suited for efficient and economical manufacturing.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations, which fall within the scope of the included claims. All matters hithertofore set forth herein or shown in the accompanying drawings are to be interpreted in an illustrative and non-limiting sense.

The invention claimed is:

1. An automated programming system comprising:
an input module for storing unprogrammed devices;
a programming module for programming devices;

an output module for storing programmed devices; and a non-text user interface system for displaying device and hardware detection and for modeling real-time representations of the input module, the programming module and the output module.

2. The system as claimed in claim 1 wherein:

the non-text user interface system has interfacing for controlling the automated programming system.

3. The system as claimed in claim 1 wherein:

the real-time representations include the input module modeled by an input device receptacle image.

4. The system as claimed in claim 1 wherein:

the real-time representations include the programming module modeled by socket adapter images.

5. The system as claimed in claim 1 wherein:

the real-time representations include the output module modeled by an output device receptacle image.

6. The system as claimed in claim 1 wherein:

the automated programming system includes a desktop handler system.

7. The system as claimed in claim 1 wherein:

the non-text user interface system has interfacing for controlling job selection.

8. The system as claimed in claim 1 wherein:

the non-text user interface system has interfacing for controlling programming.

9. The system as claimed in claim 1 wherein:

the non-text user interface system provides statistical job information.

10. The system as claimed in claim 1 wherein:

the non-text user interface system provides job setup information.

11. The system as claimed in claim 1 wherein:

the non-text user interface system provides job progress information.

12. The system as claimed in claim 1 wherein:

the non-text user interface system provides a pictorial status of blank, processed and rejected devices.

13. The system as claimed in claim 1 wherein:

the non-text user interface system provides device-per-hour information.

* * * * *